Sept. 18, 1956 H. J. GRAHAM 2,763,755
ELECTRIC ARC WELDING
Filed Sept. 27, 1952 2 Sheets-Sheet 1

Inventor
Harold J. Graham
by Roberts, Cushman & Grover
att'ys.

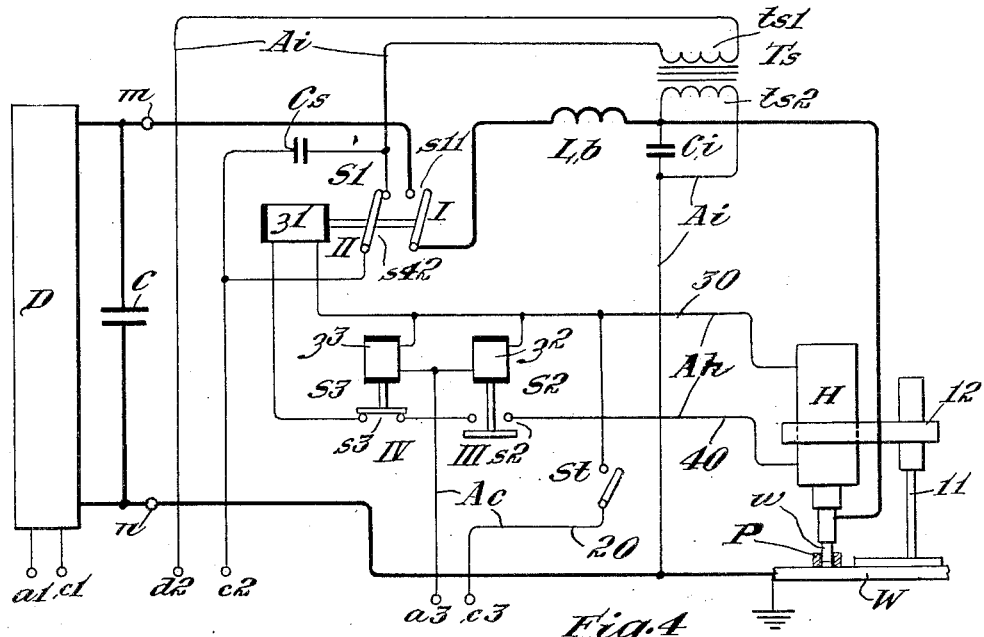
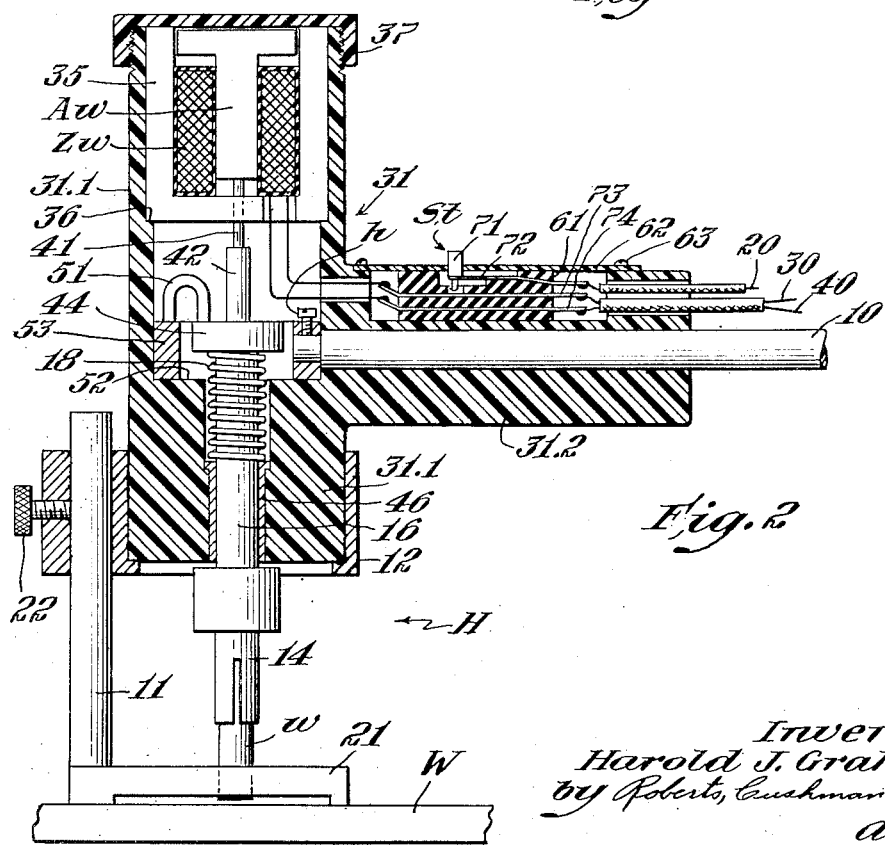

United States Patent Office 2,763,755
Patented Sept. 18, 1956

2,763,755

ELECTRIC ARC WELDING

Harold J. Graham, Highland Park, Mich., assignor to Graham Manufacturing Corporation, Detroit, Mich., a corporation of Michigan Application September 27, 1952, Serial No. 311,870

3 Claims. (Cl. 219—98)

The present invention relates to arc welding techniques and equipment therefor, wherein two workpieces are initially spaced, whereupon an arc is initiated and the two pieces brought into contact to fuse the previously melted opposite surfaces of the two workpieces.

It is the principal object of the present invention to provide equipment of the above type which is simple, comparatively inexpensive and yet certain and fully satisfactory in operation by comparatively unskilled labor, and which avoids more or less unreliable, complicated and costly elements such as electronic apparatus, and intricate control circuits including such elements.

Another object of the invention is to provide certain and adequate ionization of the gap between the initially spaced workpieces to be joined, independently of a precise shape or special material of the opposite faces of the workpieces and without the necessity for fusing or arc forming bodies mechanically associated with the workpieces.

Another object is to provide such equipment which can be easily controlled to start each individual weld whereas it is fully automatic thereafter, restoring the welding device for the next welding operation independently of the operator.

According to the invention, these ends are accomplished by welding apparatus which comprises a welding tool having spacing means for establishing an initial gap between two workpieces to be welded and electric motor means such as a solenoid operated chuck, for contacting these workpieces upon receiving a seating energy impulse, a normally open welding circuit including the gap between the workpieces held at a distance in the tool and current supply means such as a generator or transformer arranged for discharging through the gap between the workpieces, a normally deenergized ionizing circuit for supplying high frequency to the gap, a normally open seating circuit for supplying seating energy to the motor means, and a manually energizable control circuit which includes timing relay means for first closing the welding circuit, then energizing the ionizing circuit, then closing the seating circuit to actuate the motor means by applying the seating impulse, and finally for disconnecting its own energy supply for resetting the device.

In an important aspect the high frequency ionizing circuit of equipment such as above characterized incorporates a spark gap oscillator that applies an oscillatory discharge to the workpiece gap shortly after the main welding circuit including the work gap is established. For certain purposes, especially light work, a spark coil device can be substituted for the gap device.

Other objects, aspects and features will appear, in addition to those contained in the above statement of the nature and substance including some of the objects of the invention, from the following description of several typical embodiments illustrating its novel characteristics. The description refers to drawings in which Fig. 1 is the diagram of welding apparatus according to the invention including a schematical view of the welding tool;

Fig. 2 is an axial section through a welding tool of the type schematically shown in Figs. 1 and 4.

Fig. 4 is a diagram similar to Fig. 1 of a third embodiment of the invention.

Figures 1, 3:
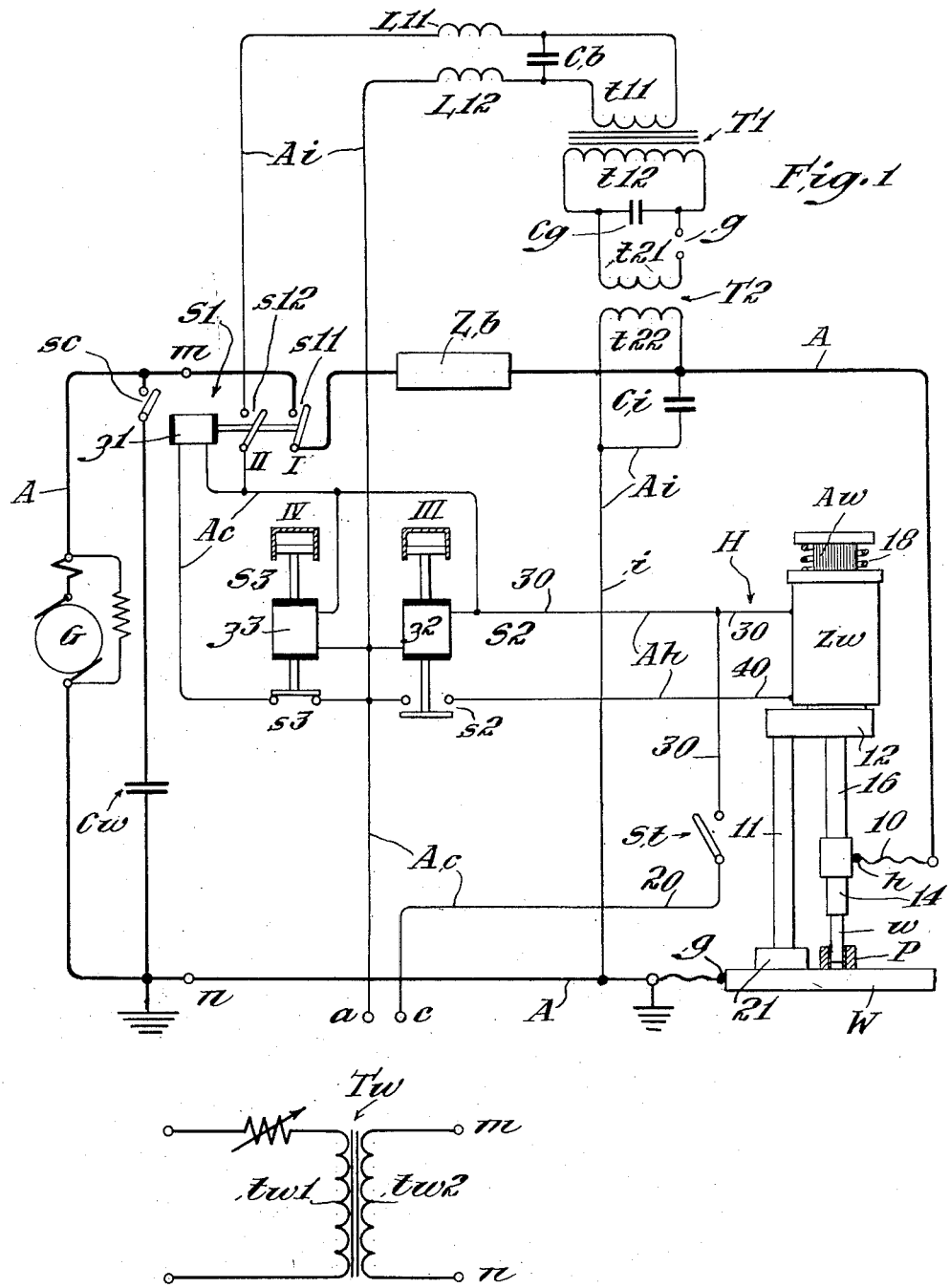
Fig. 3 is a diagram illustrating an alternative mode of operation of apparatus according to Figs. 1 and 2.

Fig. 1 shows the main welding circuit A in heavy lines. It includes a conventional welding generator G with compound exciter windings, a main contactor $s11$ which is part of a relay S1 to be described more in detail below, a ballast impedance $Zb$ and terminals $g$ and $h$ for connection to ground and to the welding tool H which will be described more in detail below. Terminal $g$ is connected to the workpiece W and ground and terminal $h$ to the chuck 14 or similar component of the tool H which provides a metallic connection to the workpiece $w$. The tool has a spacer 11 which distances the tool support or frame 12 from the stationary workpiece W, such that the second workpiece $w$ in a chuck 14 at the end of a plunger rod 16 can be held in a predetermined starting position establishing an initial gap between workpieces W and $w$. The rod 16 is fastened to an armature $Aw$ which slides within an energizing winding $Zw$. This seating motor means is normally lifted by spring 18 to form the gap between the workpieces W and $w$, but upon energization from seating circuit $Ah$ moves the chuck 14 downwardly towards W, against the force of the spring 18. The armature movement is upwardly limited by the stop arrangement which will be described in detail below with reference to Fig. 2.

The direct current generator G is preferably under compounded to impart to it a drooping voltage characteristic, that is a characteristic that provides a lowered voltage at full load. In a typical embodiment, the open generator voltage is about 70 volts which drops to about 30 volts during welding. The capacitor $Cw$ has the function of adding a current surge to the welding current provided by the generator, which surge is often desirable especially for cleaning dirty surfaces of the workpieces which might impede the formation of an arc. For average stud welding work, $Cw$ has a capacity of approximately 20,000 mf., the rating depending a good deal on the work requirements. As indicated by switch $sc$, the capacitor $Cw$ can be disconnected if it should not be needed for a particular type of work.

A ballast impedance $Zb$ is provided in conventional manner such as a resistor or, in the case of alternating current operation according to Fig. 3, a conventional inductor.

The control circuit $Ac$ is supplied at terminals $a$, $c$, for example with standard 115 volts, 60 cycle alternating current. This control circuit includes three relays S1, S2 and S3, herein referred to as welding relays S1, seating relay S2, and restoring relay S3. The coils $z1$ and $z2$ of the welding and seating relays, respectively, are connected at one side to $a$ and lead on the other side to coil $z1$ of the welding relay. Coil $z1$ is energized through normally closed contactor $s3$ of relay S3 connected to terminal $a$. Relay S1 operates two contactors $s11$ and $s12$. Contactor $s11$ is the above mentioned normally open main contactor, and $s12$ the normally open contactor of the ionizing circuit to be described more in detail below. Relay S1 is so arranged that ionizing contactor $s12$ closes a short period after main contactor $s11$, as schematically indicated in Fig. 1 by different contact distances.

Seating relay S2 operates a normally open contactor $s2$ in the motor energizing circuit $Ah$, for connection to terminal $a$, the other side of the seating circuit leading to a trigger switch $St$. The relays S2 and S3 are so designed that $s2$ closes somewhat after ionizing contactor $s12$ and that contactor $s3$ opens after $s2$ has closed, as indicated by dash pots and the numbers I, II, III, IV. These signify the above sequence of operation, contactor $s11$ closing first, then $s12$, then $s2$, and finally $s3$ opening. It will be understood that this sequence can be provided by other means such as a cam controlled relay or a drum switch.

The control $Ac$ circuit is energized by means of a trigger switch $St$ which is arranged on the tool as shown in Fig. 2 and which is normally open, being closed by the operator after the tool is brought into proper position on the workpiece W. This switch connects terminal $c$ to one end of coil $Zw$ of the seating coil whose other end leads through $s2$ to terminal $a$. The trigger switch $St$ upon closing also connects the control circuit $Ac$ to terminal $c$ for energization of the above described relays.

The ionizing circuit $Ai$ has a supply portion which includes the primary $t11$ of transformer $T1$, a bypass capacitor $Cb$, two reactances $L11$ and $L12$, contactor $s12$ of relay $S1$, connections from $s12$ through trigger switch $St$ to supply terminal $c$, and from reactor $L12$ directly to supply terminal $a$. Transformer $T1$ has a secondary $t12$ which supplies a gap oscillator which comprises the primary $t21$ of an air core transformer $T2$, a capacitor $Cg$ and an air gap $g$. The secondary $t22$ of transformer $T2$ feeds into the ionizing circuit proper which includes connections to terminals $g$ and $h$ of workpieces W and $w$. A bypass capacitor $Ci$ can be included in this circuit.

A welding tool proper well suited for purposes of the invention will now be described more in detail with reference to Fig. 2. In this figure, 11 is again the above mentioned distancing column which in this present embodiment carries a foot 21 and is adjustably attached to the tool support 12 by means of a set screw 22. It will be understood that more elaborate tool supports and spacing devices are used for speedy production, such as the pneumatic arrangement described in my Patent No. 2,537,989 dated January 10, 1951.

The housing 31 of the tool has a cylindrical main or actuator portion 31.1 and a handle portion 31.2 both of insulating plastic material. The field coil assembly with winding $Zw$ and laminated yoke 35 is fastened to the housing between a shoulder 36 and a top cover 37. The laminated armature $Aw$ sits on a metallic pin 41 adjustably screwed into a column 42 of insulating material which is in turn fastened to the metallic main rod 16 of the tool. This main rod has a collar 44 conductingly fastened thereto and slides in a bushing or sleeve 46 pressed into housing portion 31.1. The lifting spring 18 is inserted between collar 44 and sleeve 46. A collet 14 is fastened to the lower end of rod 16, and is shown as carrying a workpiece, for example a stud $w$. Several braided conductors 51 (only one of which is shown) lead from collar 44 to a metallic ring 53 resting on the bottom block 52 of the tool housing and holding at terminal $h$ the heavy stranded conductor of the main welding circuit, indicated at 10 in Figs. 1 and 2.

The trigger switch assembly is mounted on a block 61 of insulating material which is fastened to the handle portion 31.2 of the housing by means of a plate 62 and screws 63. The block 61 carries the switch $St$ proper with push button 71 and spring contact 72 opposite an exposed portion 73 of conductor 30. A direct lead 74 is imbedded in block 61. Spring 72 and leads 73, 74 are soldered to wires 20, 30, 40 respectively, indicated with corresponding numbers on Figs. 1 and 2. 20 is the trigger wire proper, and wires 30 and 40 lead to the energizing coil $Zw$ of the seating motor.

As indicated in Figs. 1 and 3 the generator G can be replaced at terminals $m, n$, by the secondary $tw2$ of a main welding transformer $Tw$, the primary $tw1$ being supplied from a service line for example of 220 volts and 60 cycle. The operating characteristic of a transformer of this type, of conventional construction, is similar to that of the above described generator, namely, approximately 70 volts open circuit and 30 volts during welding.

Fig. 4 indicates a circuit which is especially suitable for joining workpieces of comparatively small dimensions, such as studs smaller than approximately a quarter of an inch, which due to the smaller gap dimension, require less ionization energy. This circuit is quite similar to that of Fig. 1 with the exception that contactor $s12$ is normally closed and opens shortly after the closing of the main contactor $s11$. The spark coil $Ts$ is of conventional design, with a capacitor $Cs$ connected across switch $s12$ to prevent sparking, and with secondary $ts2$ connected similarly to the secondary $t22$ of Fig. 1, with a bypass capacitor $Ci$.

Fig. 4 further indicates operation by means of a main welding capacitor $C$, charged in conventional manner from a rectifier circuit $D$ which is in turn supplied with standard alternating current at $a1$, $c1$. The ionizing circuit $Ai$ is supplied with direct current at $d2$, $c2$, and the control circuit $Ac$ with alternating current at $a3$, $c3$, which also supplies the seating circuit $Ah$.

In many instances the above described system operates especially well if used with welding sleeves which protect the weld during its formation and essentially promote smooth joining of the two workpieces, without excessive beads, sputtering, or irregular distribution of the resolidified metal.

Figs. 1 and 4 schematically indicate a sleeve at P, and the chuck portion of tool H which can be provided with means for applying a sleeve P to a stud $w$ in proper position ready for welding.

It is often advisable to use studs with a flat protuberance in the center, for example applied by pointing it with an approximately 5° base angle. This central protuberance promotes symmetrical arc formation and accordingly more even metal distribution which, together with the protective effect of the sleeve provides exceptionally clean and strong welds.

If the stud is pointing downwardly, the sleeve needs no particular means for holding it, but if the stud is in oblique position or if overhead work is to be performed, a sleeve holding attachment is preferably used.

Closing of the trigger switch $St$ energizes relays $S1$, $S2$ and $S3$. As pointed out above and indicated with Roman numerals in Figs. 1 and 4, contactor $s11$ closes first and makes the main welding circuit $A$ ready for operation, this circuit being now open only at the gap between $w$ and W. Referring now particularly to Fig. 1, the contactor $s12$ of the ionzing circuit $Ai$ closes shortly thereafter. In well known manner the gap circuit immediately begins to operate, the capacitor $Cg$ charging up and upon having reached a certain voltage discharging through the spark gap $g$ with a dampened oscillation which is transferred through transformer $T2$ to the welding gap $w$–W through wire $i$ and terminal $g$, and through part of the main welding circuit $A$ and terminal $h$. The high frequency discharge across gap $w$–W ionizes the air therein and initiates an arc which melts the opposite regions of the stud and the plate within the sleeve P, the main welding energy being supplied by generator G, if desired with the aid of capacitor $Cw$ to apply a sudden energy surge which assists in providing especially clean welds.

Shortly after the closing of $s12$, the relay $S2$ closes contactors $s2$. This actuates the seating motor, in this case the solenoid $Zw$, forcing armature $Aw$ downwardly against the force of spring 18 and pressurably contacting the melted surfaces of workpieces $w$ and W.

Shortly thereafter the relay $S3$ opens contactor $s3$, deenergizing solenoid $S1$ and opening the main welding circuit at $s11$ and the ionizing high frequency circuit at $s12$. The whole cycle takes about ½ second, whereupon the trigger is released, automatically deenergizing the device and resetting it for the next cycle.

Recapitulating, the main welding circuit $A$–$h$–$w$–$W$–$g$–$A$ is closed at $s11$, the ionizing circuit $Ai$ is energized from $a$ and $c$ through $L12$–$t11$–$t11$–$s12$–$30$–$St$ and the seating circuit $Ah$ is energized from $a$ and $c$ through $s2$–$40$–$Zw$–$30$–$St$. The control circuit is energized from $a$ and $c$ through $z1$, $z2$ and $z3$ (in parallel with $s3$ closed)–$30$–$St$.

The circuit according to Fig. 4 operates quite similarly with the only difference that the spark coil arrangement delivers a high frequency discharge through the gap $w$–$W$ upon opening of switch $s42$ which as described above, is normally closed as distinguished from switch $s12$ of Fig. 1 which is normally open.

It should be understood that the present disclosure is for the purpose of illustration only and that this invention includes all modifications and equivalents which fall within the scope of the appended claims.

I claim:

1. A device for controlling a welding tool which has spacing means for establishing an initial gap between the two workpieces to be welded and electric motor means for contacting them upon receiving a seating impulse, comprising a normally open welding circuit including said gap between the workpieces as spaced by said tool and current supply means arranged for discharging through said gap, a normally deenergized ionizing circuit for supplying high frequency energy to said gap, a normally open seating circuit for supplying said seating impulse to said motor means, and a control circuit which includes timing relay means for first closing said welding circuit, then energizing said ionizing circuit, then closing said seating circuit to actuate said motor means by applying said seating impulse, and finally disconnecting its own energy supply for resetting the device.

2. Welding apparatus comprising a welding tool which includes spacing means for establishing an initial gap between two workpieces to be welded and electric motor means for contacting them upon receiving a seating impulse, a normally open welding circuit including said gap between the workpieces and spaced by said tool and current supply means arranged for discharging through said gap, a normally deenergized ionizing circuit for supplying high frequency energy to said gap, a normally open seating circuit for supplying said seating impulse to said motor means, and a control circuit which includes timing relay means for first closing said welding circuit, then energizing said ionizing circuit, then closing said seating circuit to actuate said motor means by applying said seating impulse, and finally disconnecting its own energy supply for resetting the device.

3. Welding apparatus comprising a welding tool which includes spacing means for establishing an initial gap between two workpieces to be welded and electric motor means for contacting them upon receiving a seating impulse; a welding circuit including said gap between the workpieces as spaced by said tool, current supply means arranged for discharging through said gap between the workpieces, and normally open welding switch means for completing the welding circuit, an ionizing circuit including a network connected for supplying high frequency current to said gap, and normally open ionizing switch means for energizing the ionizing circuit; a seating circuit connected to said motor means and including normally open seating switch means for energizing the motor means; and a control circuit including welding actuator means for said welding and ionizing switch means and connected in series therewith normally closed restoring switch means, seating actuator means for said seating switch means, restoring actuator means for said restoring switch means, a trigger switch, means for connecting said restoring actuator means in parallel with the restoring switch means in series to the welding actuator means, means for connecting said trigger switch in series to said parallel connected actuator means, and timing means for controlling said welding, seating and restoring actuator means to close said switch means in the order: welding switch means, ionizing switch means, seating switch means, and restoring switch means.

References Cited in the file of this patent

UNITED STATES PATENTS

| | | |
|---|---|---|
| 1,327,792 | Thornton | Jan. 13, 1920 |
| 1,332,155 | Apple | Feb. 24, 1920 |
| 1,995,001 | Ito | Mar. 19, 1935 |
| 2,018,263 | Ito | Oct. 22, 1935 |
| 2,096,495 | Hogg | Oct. 22, 1937 |
| 2,110,832 | Hogg et al. | Mar. 8, 1938 |
| 2,256,480 | Hughes | Sept. 23, 1941 |
| 2,265,169 | Hughes et al. | Dec. 9, 1941 |
| 2,342,144 | Hughes | Feb. 22, 1944 |
| 2,416,204 | Nelson | Feb. 18, 1947 |
| 2,459,957 | Palmer | Jan. 25, 1949 |
| 2,485,357 | Candy | Oct. 18, 1949 |
| 2,491,479 | Dash | Dec. 20, 1949 |
| 2,493,283 | Evans | Jan. 3, 1950 |